United States Patent
Nishikawa et al.

(10) Patent No.: US 6,925,462 B2
(45) Date of Patent: Aug. 2, 2005

(54) DATABASE MANAGEMENT SYSTEM, AND QUERY METHOD AND QUERY EXECUTION PROGRAM IN THE DATABASE MANAGEMENT SYSTEM

(75) Inventors: Norifumi Nishikawa, Machida (JP); Shigekazu Inohara, Tokyo (JP); Koichi Shimazaki, Yokohama (JP); Kiyomi Hirohata, Yokohama (JP); Kohsaku Yamahira, Yokohama (JP); Shigetoshi Hayashi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 390 days.

(21) Appl. No.: 10/041,577

(22) Filed: Jan. 10, 2002

(65) Prior Publication Data

US 2002/0116373 A1 Aug. 22, 2002

(30) Foreign Application Priority Data

Feb. 22, 2001 (JP) .................................. 2001-046318

(51) Int. Cl.⁷ .............................................. G06F 17/30
(52) U.S. Cl. ..................... 707/3; 707/1; 707/2; 707/10
(58) Field of Search .......................... 707/1–5, 10, 100, 707/102, 104.1, 203

(56) References Cited

U.S. PATENT DOCUMENTS 5,590,321 A    12/1996  Lin et al.
5,884,321 A  *  3/1999  Meffert ..................... 707/104.1
5,968,115 A  * 10/1999  Trout ......................... 718/107

FOREIGN PATENT DOCUMENTS

JP    6-231181    8/1994
JP    7-141236    6/1995

* cited by examiner

Primary Examiner—Alford W. Kindred
(74) Attorney, Agent, or Firm—Mattingly, Stanger, Malur & Brundidge, P.C.

(57) ABSTRACT

The present invention relates to an optimization method in a database management system having the function of accessing external databases. Conventionally, whether functions contained in a query can be executed in external databases depends on a database management system having the functions, and therefore there has been a problem in that a database utilization method cannot apply to query optimization and query execution performance is reduced. To solve the above problem, a database management system having the function of accessing external databases is provided with an optimization step comprising the steps of: obtaining specification about whether to execute functions in a query in external databases; determining whether data referred to in a query is confined to one database; and determining whether a user specifies that the functions in the query are executed in external databases.

7 Claims, 10 Drawing Sheets

FIG. 4

| COLUMN NAME 401 | TABLE NAME 402 | EXTERNAL DATABASE NAME 403 | TYPE OF DATABASE MANAGEMENT SYSTEM 404 | VERSION 405 |
|---|---|---|---|---|
| c1 | T1 | db01 | DBX1 | 5.0 |
| c2 | T2 | db02 | DBX1 | 5.0 |

901  902a  902b  902c  902d  902e select*from T1, T2 where length(T1,c1)=10 and T2,c2>T1,c1 and length(T2,c2)>15

DATABASE MANAGEMENT SYSTEM, AND QUERY METHOD AND QUERY EXECUTION PROGRAM IN THE DATABASE MANAGEMENT SYSTEM

FIELD OF THE INVENTION

The present invention relates to a database management system, a query method in the database management system, and a query execution program in the database management system, and more particularly to query optimization in them.

BACKGROUND OF THE INVENTION

A conventional query optimization method, as disclosed in U.S. Pat. No. 5,590,321, includes the steps of: determining whether all data referred to in a query is contained in one external database; and determining whether functions in the query can be executed in the one external database, and when all data contained in the query is contained in one database and all the functions in the query can be evaluated in the external database, the query is executed in the external database.

It is desirable that whether functions in a query can be executed or are desirably executed in external databases is decided by how users use data bases in the interest of optimization, based on users' experience and knowledge such as function names, the format of data contained in the external databases, and how the functions are used in the query. However, in the prior art, whether functions contained in a query can be executed in external databases depends on a database management system having the function of accessing external databases. Consequently, query optimization as intended by users cannot be achieved and query execution performance is reduced. This has been a problem of the prior art.

An object of the present invention is to provide a database management system that can apply a user-intended database utilization method to query optimization by enabling users to specify execution places of functions in a query, a query method in the database management system, and a query execution program in the database management system, and particularly to achieve query optimization in them.

Another object of the present invention is to provide a query optimization method that permits users to specify execution places of functions in the query for each of types of database management systems, each of types and version of database management systems, and each of databases.

SUMMARY OF THE INVENTION

The above object is achieved by a database management system having the function of accessing one or more external databases, comprising: a means for specifying whether functions in a query are executed in external databases; and a means for determining whether data referred in a query is confined to one external database, wherein, when a user's query is confined to the one external database and the user specifies execution in the external database, the query is processed in the external database.

Further, the above object is achieved by a query method in a database management system having the function of accessing one or more external databases, the method including the steps of: obtaining specification about whether functions in a query are executed in external databases; determining whether data referred in the query is confined to one external database; and determining whether a user specifies whether functions in the query are executed in the external database.

Further, the above object is achieved by the query method in the database management system, the query method including the steps of: if a query is confined to the one database and the user specifies that all functions in the query are processed in the one external database, creating an access procedure for processing the query in the one external database; and if the user specifies that functions in the query are not executed in the one external database, creating an access procedure for executing the functions in a database within the database management system having the function of accessing external databases.

Further, the above object is achieved by a query method in the database management system, the query method including the step of the user defining whether functions in the query are executed in external databases.

Further, the above object can be achieved by a query execution program in a database management system having the function of accessing one or more external databases, the query execution program executing the procedures for: obtaining specification about whether functions in a query are executed in external databases; determining whether data referred in the query is confined to one external database; and determining whether a user specifies that functions in the query are executed in the external database.

BRIEF DESCRIPTION OF THE DRAWINGS

FIG. 4 is a diagram showing a configuration of a dictionary table;

DETAILED DESCRIPTION OF THE PREFERRED EMBODIMENTS

Figure 1:
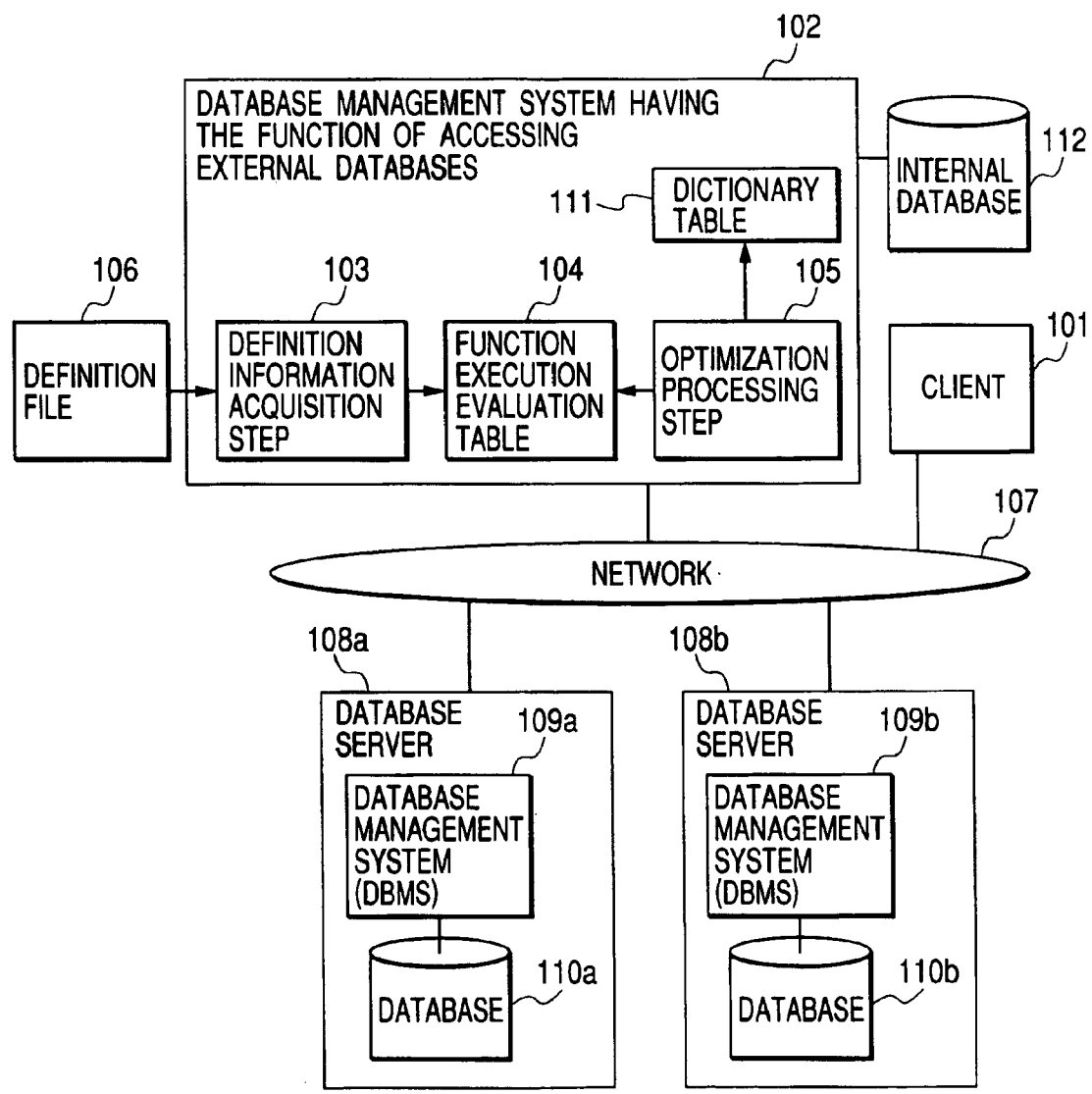
FIG. 1 is a diagram showing a configuration of a database management system having the function of accessing external databases of an embodiment of the present invention.

Hereinafter, embodiments of the present invention will be described using FIGS. 1 to 11. FIG. 1 shows the configuration of a database management system of an embodiment of the present invention that has the function of accessing external databases. The database management system having the function of accessing the external database comprises: a client 101 making a query; a database management system 102 having the function of accessing external databases that accepts and executes a query from the client 101; database servers 108a and 108b that include database management systems 109a and 109b managing databases 110a and 110b, respectively; a network 107 connecting the client 101 and the database servers 108a and 108b; and an internal database 112. The database management system 102 having the function of accessing external databases includes; a definition information acquisition step 103 that reads a definition file 106 describing execution places of functions in a query, and creates a function execution evaluation table 104; a dictionary table III storing information of an external database management system used in the database management system 102 having the function of accessing external databases and table definition information; and an optimization processing step 105 that optimizes a query entered from the client 101 by referring to the dictionary table 111 and the function execution evaluation table 104.

In FIG. 1, the client 101, the database management system 102 having the function of accessing external databases, and the database management systems 109 exist in machines different from each other, and are connected over the network 107. However, the client 101, the database management system 102 having the function of accessing external databases, and the database management systems 109 may be disposed in an identical machine. In this case, the network 107 is unnecessary.

Figure 2:
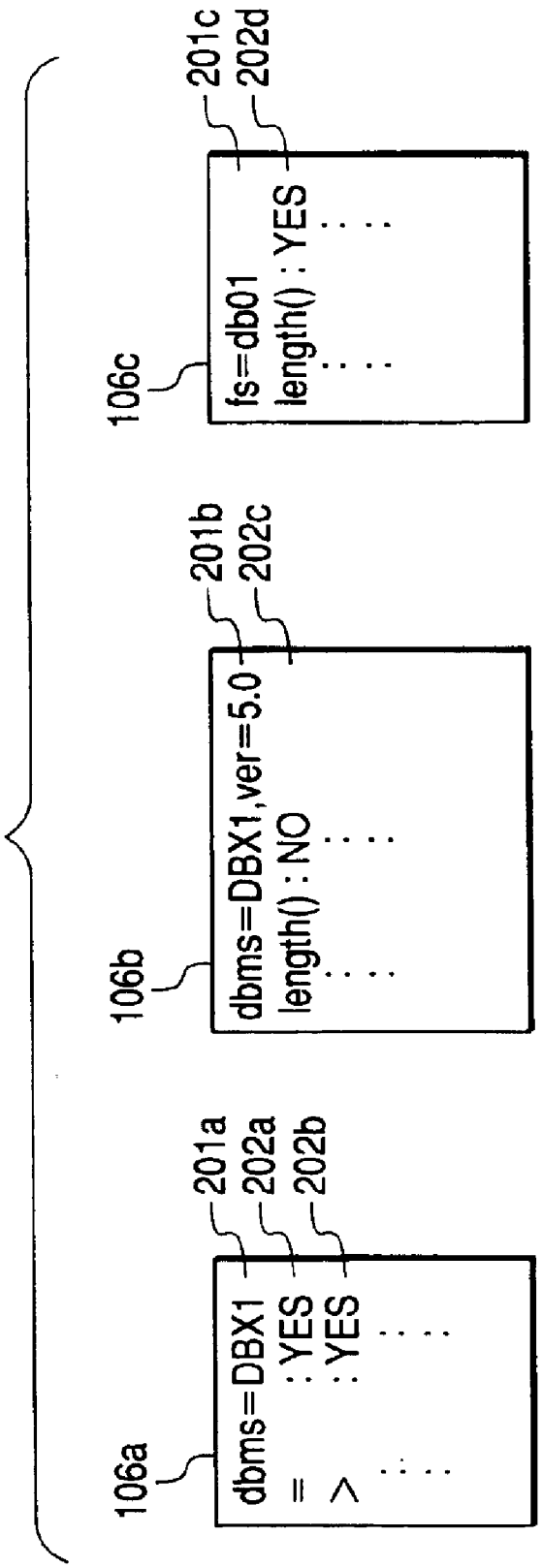
FIG. 2 is a diagram showing a description example of a definition file.

FIG. 2 shows a description example of definition information described in the definition file 106. A user creates a definition file 106, based on knowledge about the operation of external database management systems. That is, a method of user-intended optimization is defined here. Next, the structure of the definition file 106 will be described. The definition file 106 comprises; a record 201 indicating whether the definition file contains a definition for each of types of database management systems, a definition for each of types and versions of database management systems, or a definition for each of databases; and a record 202 describing whether functions in a query can be executed in external databases. In an example of FIG. 2, a definition file 106a has a record 201a with the value of dbms=DBX1, which indicates that contents described in the definition file 106a are effective for database management systems whose type is DBX1. A definition file 106b has a record 201b with the value of dbms=DBX1, ver=5.0, which indicates that the definition file 106b is effective for version 5 of database management systems whose type is DBX1. A definition file 106c has a record 201c with the value of fs=db01, which indicates that a definition described in the definition file 106c is effective for an external database db01.

Figure 3:
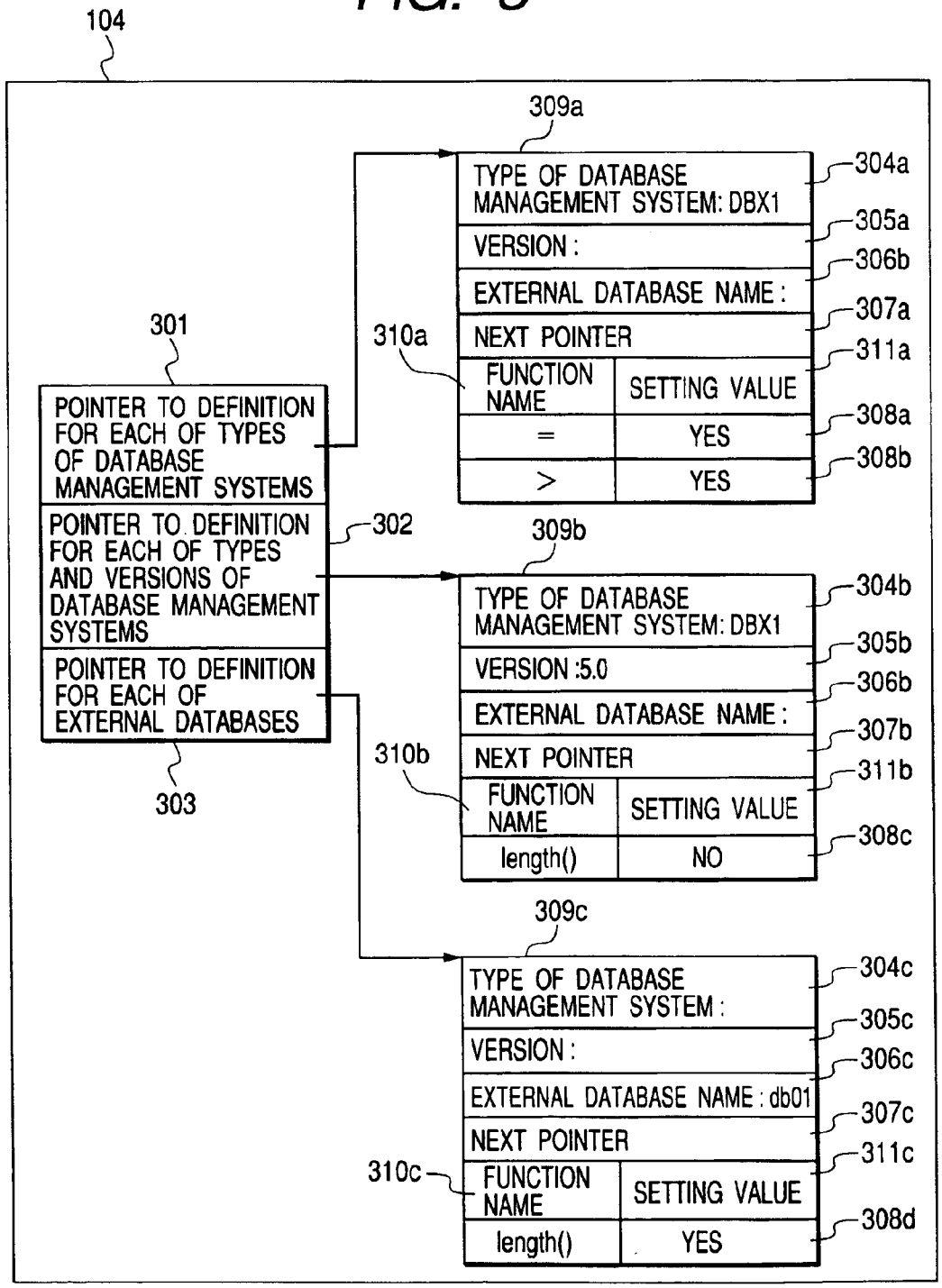
FIG. 3 is a diagram showing a configuration of a function execution evaluation table.

FIG. 3 shows a structure of the function execution evaluation table 104. The function execution evaluation table 104 has: a pointer 301 to definition information 309a for each of types of database management systems; a pointer 302 to definition information 309b for each of types and versions of database management systems; and a pointer 303 to definition information 309c for each of external databases. Each of the definition information 309a, 309b and 309c consists of; an area 304 for storing the type of a database management system; an area 305 for storing a version; an area 306 for storing an external database name; an area 307 for storing a pointer to other definition information; and a record 308 for storing a function name in a query and a value indicating whether that function can be executed in an external database. The record 308 further consists of an area 310 for storing a function name and an area 311 for storing a value. By a step shown in FIG. 3, the contents defined in the definition file 106 of FIG. 2 can be included in the function execution evaluation table 104 of the database management system 102 of FIG. 1. As a result, a method of user-intended optimization can be included in the database management system 102.

FIG. 4 shows a table structure of a dictionary table 111 to store the definitions of external databases and table definitions, used in the database management system 102 of FIG. 1 having the function of accessing external databases. The dictionary table 111 consists of a field 401 for storing a column name; a field 402 for storing a table name; a field 403 for storing an external database name; a field 404 for storing the type of a database management system managing external databases; and a field 405 for storing the version of the database management system.

Figure 5:
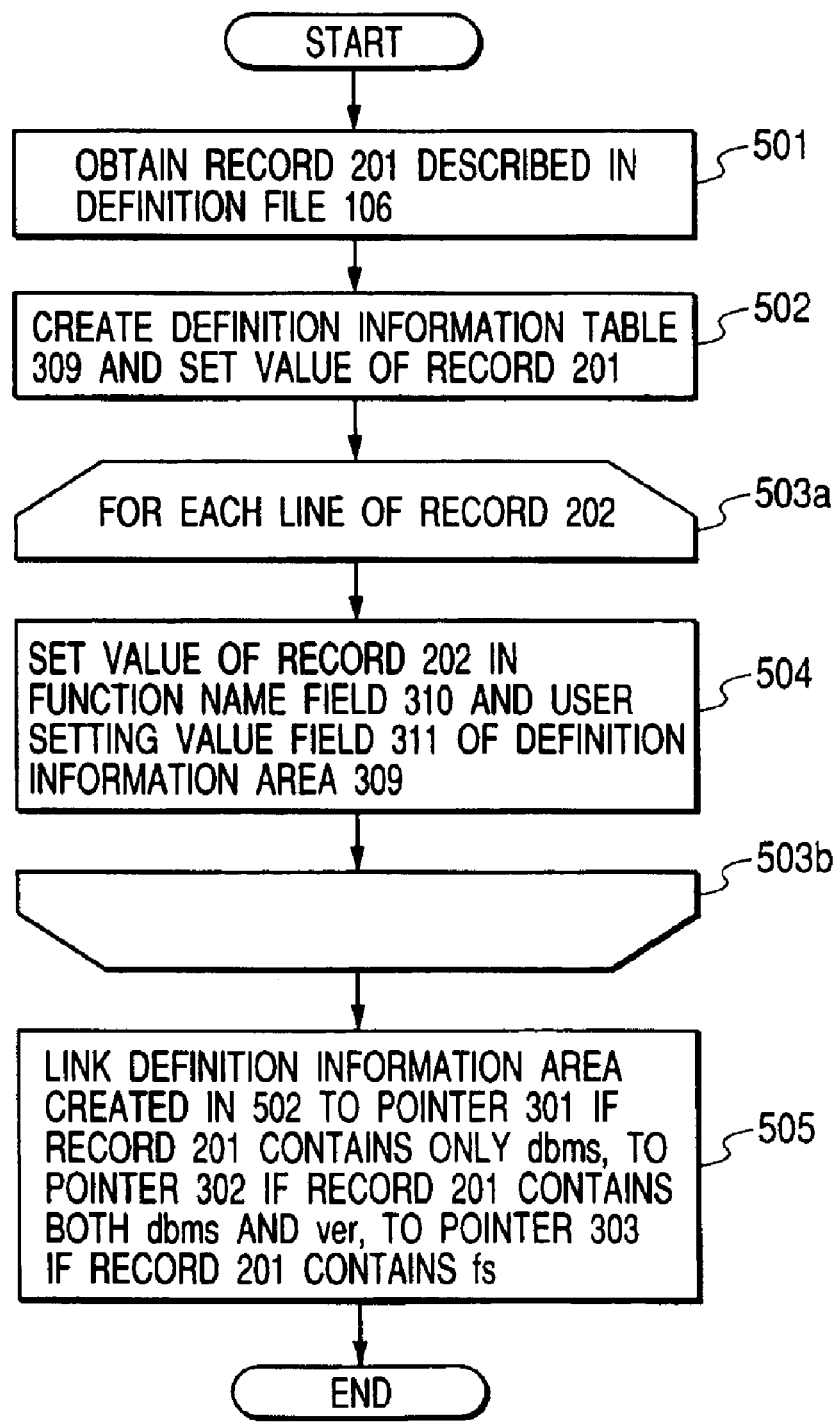
FIG. 5 is a diagram showing an example of processing performed in the definition information acquisition step 103.

FIG. 5 shows an example of processing performed in the definition information acquisition step 103. In this processing, the following processing is performed for all definition files 106. First, a record 201 described in the definition file 106 is obtained (step 501). Next, definition information 309 is created and the value of the record 201 is set in the definition information 309. If the record 201 indicates the type and version of a database management system (the case of 106a in FIG. 2), the type of a database management system specified in the record 201 is stored in the field 304 for storing the type of a database management system. If the record 201 indicates the type and version of a database management system (the case of 106b in FIG. 2), the type of a database management system specified in the record 201 in the field 304 for storing the type of a database management system, and the version of the database management system specified in the record 201 is stored in the field 305 for storing the version of a database management system. If the record 201 indicates the name of an external database (the case of 106c in FIG. 2), the name of an external database specified in the record 201 is stored in the field 306 for storing an external database name (step 502).

Thereafter, the following processing is repeatedly performed for each of records 202 of the definition file 106 currently processed (steps 503a, 503b). First, a record 308 representing an execution destination for each query function is created within the definition information 309. Next, a value described on the left side of a colon (:) of record 202 is stored in the function name area 310 of record 308, and a value described on the right side is stored in the setting value area 311 of record 308 (step 504).

After processing of step 504 is completed for all records 202 of the definition file 106 currently processed, the created definition information 309 is pointed to from the field 301 of the function execution evaluation table if the record 201 indicates the type of a database management system, from the field 302 of the function execution evaluation table if the record 201 indicates the type and version of a database management system, and from the field 303 of the function execution evaluation table if the record 201 indicates the name of an external database. If definition information 309 is already pointed to from the field 301, 302, or 303, the next definition information 309 is pointed to from the next pointer field 307 of definition information 309 pointed to.

Figure 6:
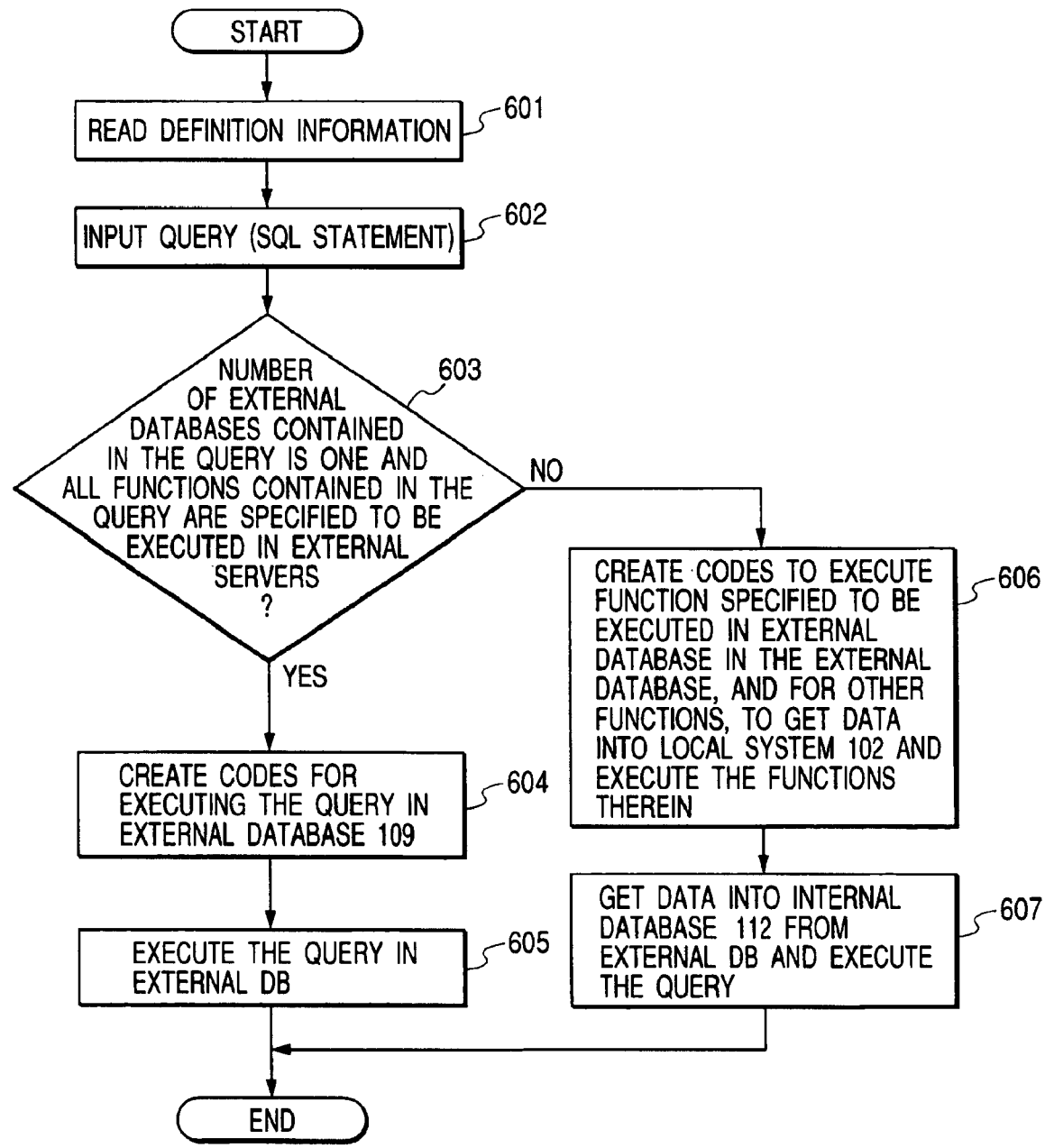
FIG. 6 is a diagram showing an example of processing performed in the optimization processing step 105.

FIG. 6 shows an example of processing performed in the optimization processing step 105. First, using the definition information acquisition step 103, a definition file 106 is set in the function execution evaluation table 104 (step 601). If a query is inputted from the client 101 (step 602), for the inputted query, it is judged whether the number of external databases contained in the query is one and all functions contained in the query are specified to be executed in external servers (step 603). If step 603 is satisfied, codes are created to execute the query inputted in step 601 in an external database (step 604), and the query is executed in the external database (step 605). If not so, functions specified to be executed in external databases are executed in the external databases, and for other functions, codes are created to get data into the local system 102 for execution (step 606). The functions specified to be executed in external databases are executed in the external databases, results are stored in the internal database 112, functions inexecutable in external databases are executed, and results are obtained (step 607).

Figure 7:
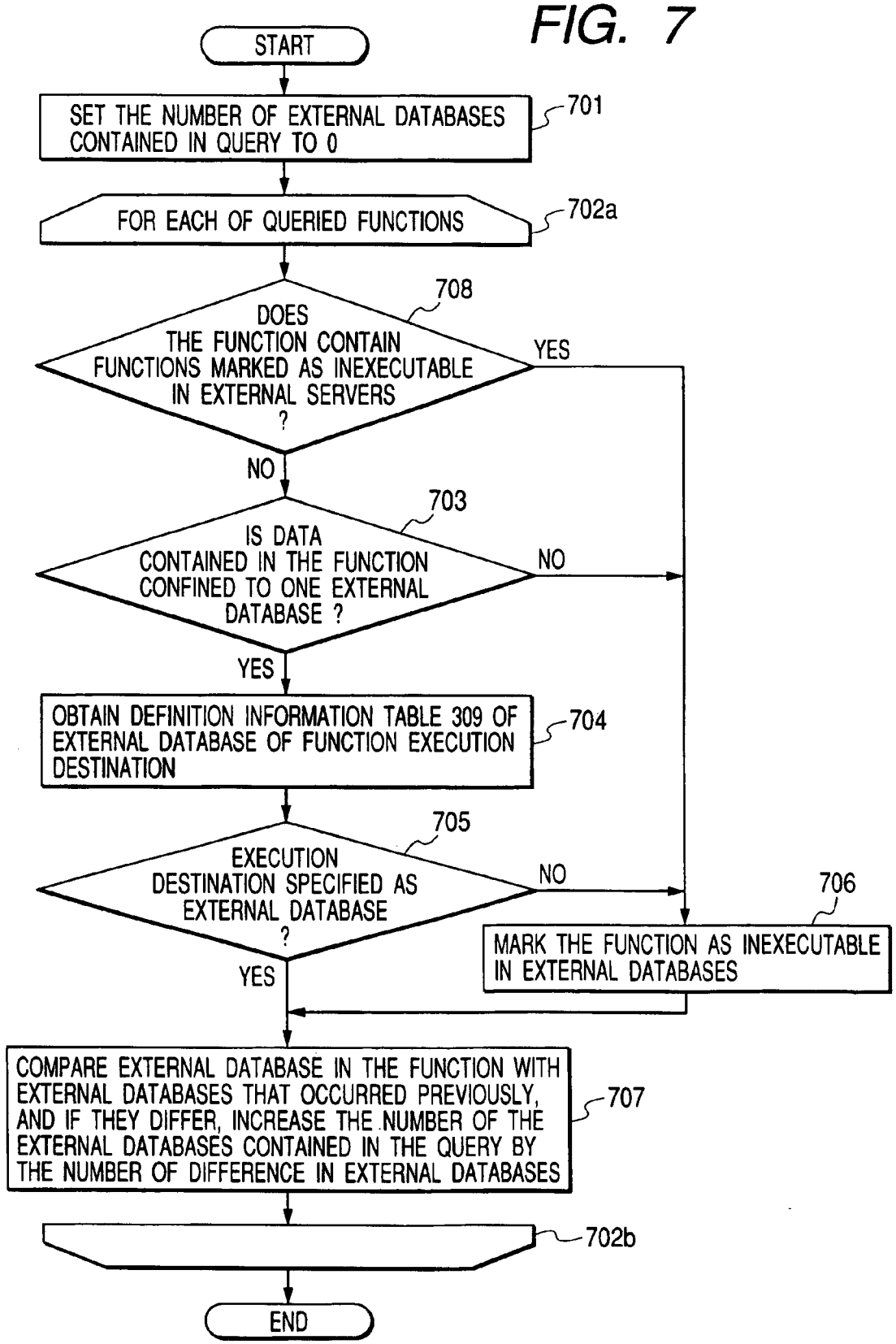
FIG. 7 is a diagram showing an example of processing performed in the query execution evaluation step 603.

FIG. 7 shows an example of processing performed in the query execution evaluation step 603. The number of external servers contained in a query is initialized to 0 (step 701). Next, for each of functions in the query, the following processing is repeated (steps 702a, 702b).

Figures 9, 10:
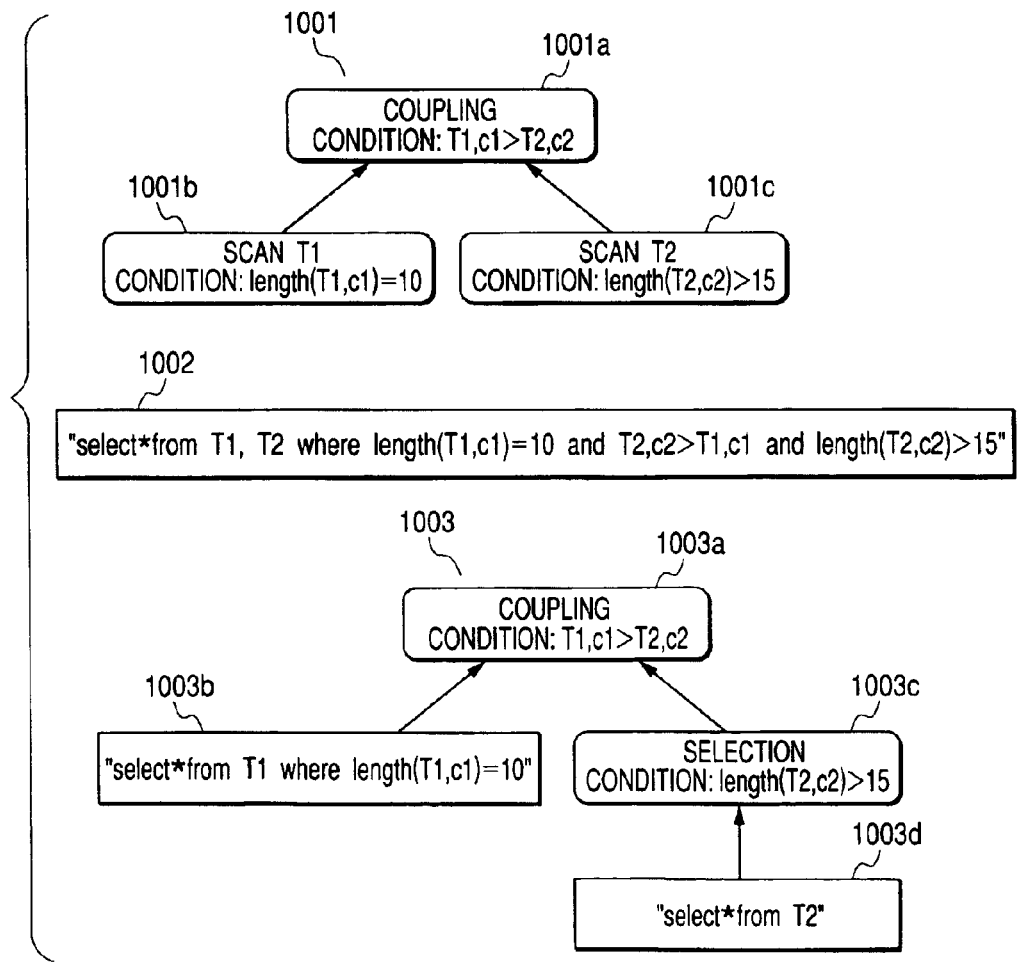
FIG. 9 shows a query example.
FIG. 10 is a diagram showing an example of codes showing an access procedure created for a query.
Figure 11:
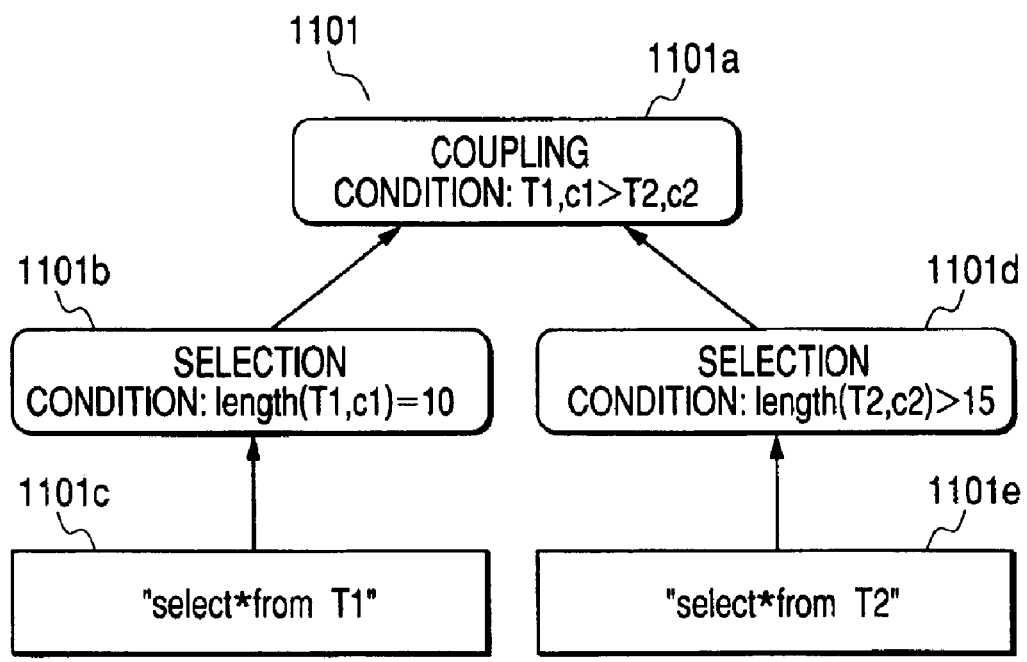
FIG. 11 is a diagram showing an example of codes showing an access procedure created for a query in the case where functions of the present invention are not provided.

A query example of FIG. 9 will be described. A query of FIG. 9 is to obtain results of coupling results of searching table T1 with search condition:length(T1.c1)=10 and results of searching table T2 with search condition:length(T2.c2) >15, by condition T2.c2>T1.c1. The query search condition functions 902b (=) and 902e (>) are defined in the definition file 106 of FIG. 2 so as to be executed in an external database management system DBX1. A function 902a (length) is defined so as to be executed in the external database db01 (the definition file 106c of FIG. 2). On the other hand, length of a function 902d is defined so as not to be executed in external databases (the definition file 106b of FIG. 2).

If the contents of the query are as shown in FIG. 9, it is determined whether functions contained in the function 902a are specified to be executable in external databases in 309 of FIG. 3. In this case, only column T1.c1 is contained in the length function 902a, but since columns are not a function, it is judged that the function 902a does not contain functions marked as inexecutable in external servers (step 708).

Next, it is judged whether data contained in a function is confined to one external database. This is performed by consulting the dictionary table 111 and counting up the number of external databases to which column specifications contained in the function belong (step 703). If the function extends to plural external databases, it is marked as inexecutable in external servers and the function is judged (step 706). If the function is confined to one external database, definition information 309 provided for each of external databases of destinations to execute the function, each of the types and versions of database management systems managing the external databases, and each of the types of the database management systems is obtained from the function execution evaluation table 104 (step 705). It is judged whether the function is specified to be executed in external servers (step 705). If the function is defined as executable in definition information 309 for each of external databases (in the case where a record 308 having the name of the function in a function name field 310 exists and the value of a setting value field 311 of the record 308 is YES), it is judged that the function is specified to be executed in external databases. On the other hand, if the value of the setting value field 311 of the record 308 is NO, it is judged that the function is not specified to be executed in external databases. If a record 308 having the name of the function in the function name field 310 does not exist in the definition information 309 for each of external databases, whether the function is specified to be executable in external databases is judged using the definition information 309 for each of database management systems and versions thereof, obtained in step 704. If a record 308 having the name of the function in the function name field 310 does not exist in the definition information 309 for each of the types and versions of database management systems, whether the function is specified to be executable in external databases is judged using the definition information 309 for each of database management systems, obtained in step 704. If a record 308 having the name of the function in the function name field 310 does not exist in the definition information 309 for each of the types of database management systems, whether the function is specified to be executable in external databases is judged (step 705). Thereafter, external servers in the function and external databases that occurred previously are compared, and if they differ, the number of external servers contained in the query is increased by the number of the different databases (step 707).

Figure 8:
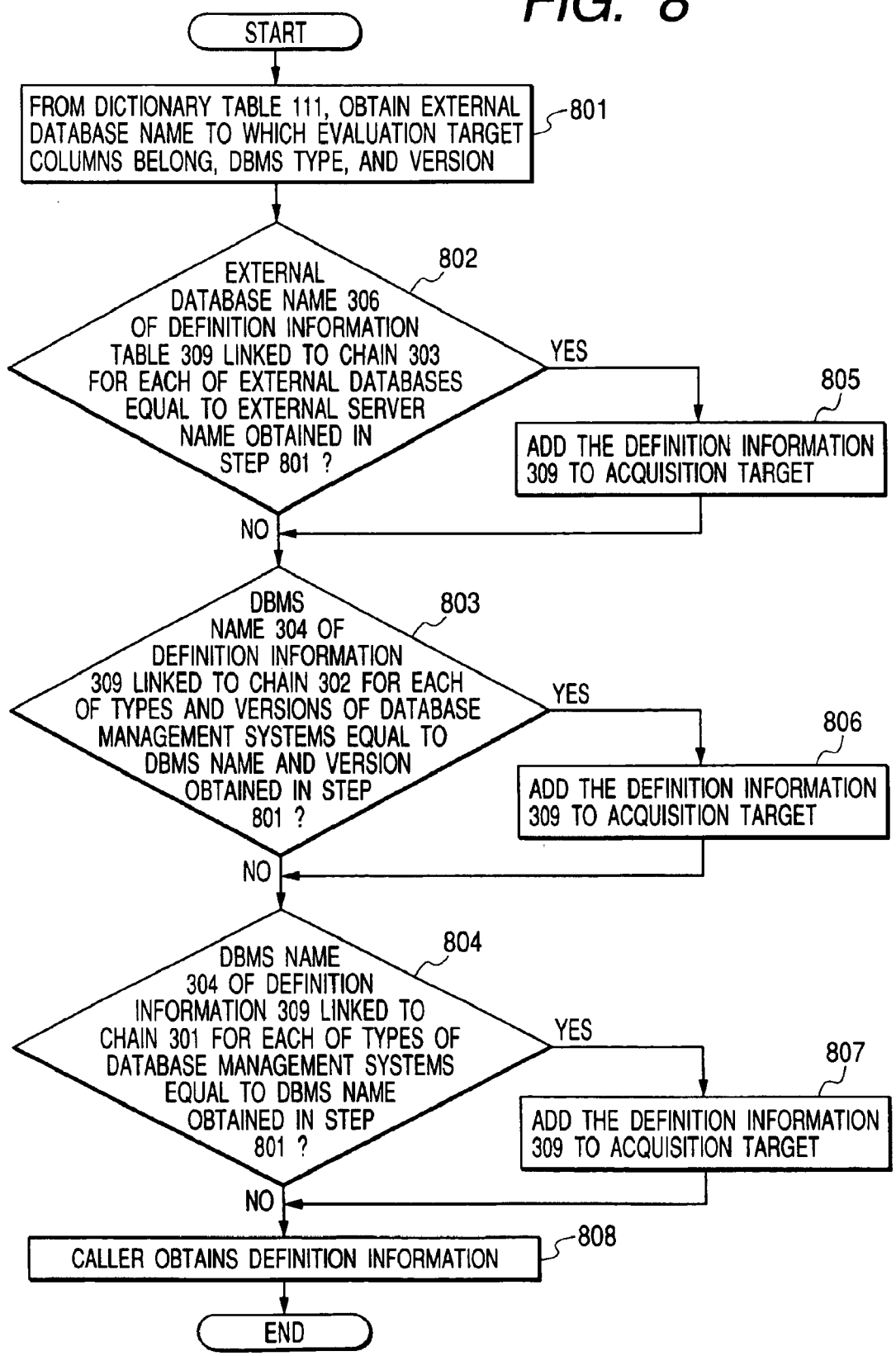
FIG. 8 is a diagram showing an example of processing performed in the definition information acquisition step 704.

FIG. 8 shows an example of processing performed in step 704 for obtaining definition information 309 of external databases of function execution destination. From the dictionary table 111, an external database name to which columns to obtain definition information belong, and the type and version of a database management system managing the database are obtained (step 801). Next, for each of definition information 309 chained from the pointer 303 of the function execution evaluation table 104, the external database name obtained in step 801 and the value of an external database name field 306 of the definition information 309 are compared (step 802). If the comparison gives an equal result, the definition information 309 is marked as information to be obtained (step 805). Next, for each of definition information 309 chained from the pointer 302 of the function execution evaluation table 104, the type of database management system obtained in step 801 and the value of a database management system type field 304 of the definition information 309, and the version obtained in step 801 and the value of a version field 305 of the definition information 309 are respectively compared (step 803). If the comparison gives an equal result, the definition information 309 is marked as information to be obtained (step 806). Next, for each of definition information 390 chained from the pointer 301 of the function execution evaluation table 104, the type of database management system obtained in step 801 and the value of the database management system type field 304 of the definition information 309 are compared (step 804). If the comparison gives an equal result, the definition information 309 is marked as information to be obtained (step 807). Last, a caller obtains the definition information 309 marked as information to be obtained in steps 805 to 807 (step 808).

Hereinafter, a description will be made of an example of creating the function execution evaluation table 104 shown in FIG. 3 from the definition files 106a to 106c shown in FIG. 2, referring to FIG. 5. This processing is performed using the definition information acquisition step 103. In step 501, record 201a of the definition file 106a is read. The record 201a is described as dbms=DBX1 wherein dbms= indicates that the definition file contains a definition for each of types of database management systems and the type of the database management system is DBX1. Accordingly, by step 502, DBX1 is set in a database management system type field 304a of definition information 309a. Next, in step 504, record 202a is obtained, a function name = and a value (YES in the case of record 202a) indicating whether it is executable in an external database (in this case, an external database under a database management system DBX1) are respectively set in function name field 310a and setting value field 311a of record 308a. In the same way, record 202b is also obtained to create record 308b. Next, in step 505, the address of the definition information 309a is set in the function execution evaluation table 104. In the case of the definition file 106a, since the record 201a is written as dbms=DBX1, it is judged that the definition file contains a definition for each of types of database management systems, and the address of the definition information 309a is set in the field 301.

In the case of the definition file 106b, since the record 201b is written as dbms=DBX1,ver=5.0, DBX1 and 5.0 are respectively set in a database management system type field 304b and a version field 305b of definition information 309b (steps 501, 502). Thereafter, record 202c is read to create record 308c (step 504). Last, since both a database management system type and version are described in the record 201b, it is judged that the definition file 106b contains a definition for each of types and versions of database management systems (DBX1 5.0 in the case of the definition file 106b), and the definition information 309b is pointed to from the pointer 302 of the function execution evaluation table 104 (step 505).

In the case of the definition file 106c, since the record 201c is written as fs=db01, db01 is set in an external database name field 306c of definition information 309c (steps 501, 502). Thereafter, record 202d is read to create record 308d (step 504). Last, since an external database name is described in record 201c, it is judged that the definition file 106c contains a definition for each of external databases (database db01 in the case of the definition file 106c), and the definition information 309c is pointed to from the pointer 303 of the function execution evaluation table 104 (step 505).

Hereinafter, using a query 901 shown in FIG. 9 as an example, a description will be made of how it is judged as to whether it can be executed in an external server, as described in FIG. 6. Functions 902 to be judged, contained in the query 901, are scalar function length (902a), = comparison operation (902b), > comparison processing (902c), length (902d), and > comparison processing (902e). The database management system 102 having the function of accessing external databases accepts the query 901 from the client 101 in step 601 and judges whether the query can be executed, in step 603. In step 603, a processing flow shown in FIG. 7 is performed.

After the number of external databases contained in the query is initialized to 0, evaluation is made for each of functions of the query. In the case of the query example 901, it is determined in how many external servers data contained in length function 902a exists (step 703). In this case, since the number of columns contained in the length function 902a is 1, evaluation results in step 703 are Y.

Next, in step 704, definition information of an external database of execution destination of the length function 902a is obtained. In step 704, a processing flow shown in FIG. 8 is performed. In step 801, from the dictionary table 111, an external database name to which evaluation target columns belong, and the type and version of a database management system managing the database are obtained. In this case, since column c1 belongs to table T1 as shown in FIG. 4, an external server name, and the type and version of a database management system of record 410a of the dictionary table 111 having an identical column name and table name are data to be obtained, and their values are db01, DBX1, and 5.0, respectively. Next, in step 802, definition information 309c linked to a chain from the field 303 of the external server execution evaluation table 104 is referred to. The value of the external database name field 306c of the definition information 309c is db01, which is equal to the external database name obtained in step 801. Therefore, the definition information 309c is returned (step 805). Next, definition information 309b pointed to from the field 302 of the external server execution evaluation table 104 is referred to. The value of the database management system type field 304b and the value of the version field 305b of the definition information 309b are respectively DBX1 and 5.0, which are respectively equal to the type and version of database management system obtained in step 801. Therefore, the definition information 309b is marked as information to be obtained (step 806). Next, definition information 309a pointed to from the field 301 of the external server execution evaluation table 104 is referred to. The value of the database management system type field 304a of the definition information 309a is DBX1, which is equal to the database management system type obtained in step 801. Therefore, the definition information 309a is obtained (step 806). As a result of the above processing, in step 704, the definition information 309c, 309b, and 309a are obtained as definition information of the external database of execution destination.

Next, in step 705, it is determined whether the length function 902a is specified to be executed in the external database. The definition information 309c, 309b, and 309a are searched in that order for record 308 having length( ) as function name 310, and the value of the setting field 311 of the first record to be found indicates whether the function is specified to be executed in the external server. In this case, record 308d is the first record to be found and its setting value is YES, so that it is determined that the function can be executed in the external server. Next, in step 707, the number of external databases that have so far occurred is calculated and set to 1 because the external database occurs for the first time.

Next, the same evaluation is made for function=(902b). In this case, in step 708, it is determined whether the function 902b contains functions marked as inexecutable in external databases. It is determined that the function contains none of them because function length (901a) can be executed in an external database. Next, in step 703, the number of external databases contained in the function 902b is calculated and set to 1 because the function 902b contains no column and the function 902a contains only T1.c1 as a column. Next, in step 704, definition information of an external database in which the column T1.c1 is contained is obtained. In this case, as is the case with the function 902a, the definition information 309c, 309b, and 309a are returned as definition information of an external database of an execution destination. Next, in step 705, it is determined whether the function 902b is specified to be executed in the external database. In this case, record 308a is the first record to be found and the value of the setting value field 311a of the record 308a is YES, so that it is determined that the function 902b can be executed in the external database. Last, in step 707, since the column T1.c1 belongs to the same external database as in the length function 902a processed previously, the number of external databases is not increased.

Next, the same evaluation is made for function>(902c). In this case, in step 708, it is determined from the setting value field 311a of the record 308b whether the function 902c can be executed in external databases. Since the value of the field 311a is YES, it is determined that the function contains no function marked as inexecutable in external databases. In step 703, whether the number of external databases contained in the function 902c is one is determined by consulting the dictionary table 111. Two columns, T1.c1 and T2.c2, are contained in the function 902c. An external database referred to by the column T1.c1 is db01 from record 410a and an external database referred to by the column T2.c2 is db02 from record 410b. Since they are different, evaluation result in step 703 is N and the function 902c is marked as inexecutable in external databases (step 706). Thereafter, in step 707, where the number of external databases is increased, the number of external databases referred to by the query is 2 because db02 occurs newly (step 707).

Next, in step 705, it is determined whether the length function (902d) is specified to be executed in the external database. In this case, record 308c is the first record to be found and the value of the setting value field 311b of the record 308d is NO, which indicates that the function cannot be executed in external servers. Therefore, the function 902d is marked as inexecutable in external databases. Next, in step 707, the number of external databases that have so far occurred is calculated. Since the function contains only the column T2.c2 which already occurs, the number of external databases remains set to 2.

Last, the same evaluation is made for function=(902e). In this case, in step 708, it is determined whether the function 902e contains functions marked as inexecutable in external databases. Since the function 902d is already marked as inexecutable in external databases, the function 902e is also marked as inexecutable in external databases (step 706).

Next, in step 603, it is determined whether the number of databases contained in the query is one. Since the number of external databases is two, an access procedure as shown in 1003 of FIG. 10 is created (step 605). For the query shown in 901, in the case where a database management system accesses a database of its own, as shown in 1001 of FIG. 10, creation is made of code (1001b) to scan table T1 under condition length(T1.c1)=10, code (1001c) to scan table T2 under condition length(T2.c2)>15, and code 1001a to couple execution results of the codes 1001b and 1001c under condition T1.c1>T2.c2. In step 605, code is created for replacing the codes of scanning the tables by an SQL statement to obtain data from a table in an external database. At this time, if scanning conditions are such that execution can be made in external databases, the conditions are presented to the SQL statement, and if the scanning conditions are such that execution cannot be made in external databases, data obtained from an external database is presented with code to make selection under conditions in which execution cannot be made in the external database. In an example of the query 901, creation is made of code 1003b having an SQL statement to obtain data of table T1 from an external database under condition length (T1.c1=10), code 1003d to obtain data from table T2 in an external database, code 1003c to select data obtained from 1003d under length (T2.c2)>15, and code 1003a to couple execution results of the codes 1003b and 1003c under condition T1.c1>T2.c2.

If the number of external databases referred to by the query 901 is one and all functions can be executed in an external database, in step 604, as shown in 1002, code 1002 is created to execute the whole of the query 901 in the external database.

In a database management system not having the present invention, since whether scalar function length( ) is executed in an external databases cannot be decided at user's disposal, if length( ) is incorporated in the database management system so that it cannot be executed in external databases, even if length( ) can be executed in the external database db01, conditions (functions 902a, 902b) containing length( ) cannot be executed in external databases. Accordingly, codes created for the query 901, as shown in 1101 of FIG. 11, include code 1101c to unconditionally obtain data from table T1, code 1101b to select data under condition length(T1.c1)=10 from the result of executing 1101c, code 1101e to unconditionally obtain data from table T2, code 1101d to select data obtained by 1101e under condition length(T2.c2)>15, and code 1101a to couple the execution results of 1101b and 1101d under condition T1.c1>T2.c2. As a result, the data of the table T1 to be obtained from the external database db01 cannot be selected, reducing query performance. Since the present invention permits users to specify what functions to be executed in external databases, by specifying that the function length( ) is executed in the external database db01, the amount of data obtained from the external database db01 can be reduced, contributing to an increase in query performance.

According to the present invention, since a database management system having the function of accessing external databases is provided with a means for users to be able to specify what functions in a query to execute in external databases, query optimization can be achieved as intended by users and query execution performance can be sped up.

According to another aspect of the present invention, whether to execute functions in a query in external databases can be specified for each of types of database management systems, each of types and versions of database management systems, and each of external databases. Consequently, the amount of operation required for specification can be reduced. Also, focusing attention on portions specified differently depending on the versions of database management systems and external databases, common items can be picked up for definition, contributing to reduction in the amount of operation required for specification.

What is claimed is:

1. A database management system having the function of accessing one or more external databases, comprising:

a means for specifying whether functions in a query sent from a user are executed in external databases; and a means for determining whether data referred to in said query sent from the user can be processed by access to one external database, wherein, when it is determined that all functions referred to in said query can be processed by access to said one external database and the user specifies execution in said one external database, said query is processed in said one external database, and when it is determined that all functions referred to in said query cannot be processed by access to said one external database, then after ones of said functions contained in said query specified to be executed in said one external database are executed, others of said functions in said query not executable in said one external database are executed in an internal database after getting an executed result into said internal database from said one external database.

2. A query method in a database management system having the function of accessing one or more external databases, the method including the steps of:

(a) obtaining specification about whether functions in a query sent from a user are executed in external databases;

(b) determining whether said functions referred to in said query are executable by access to one external database and are specified by said user to be executed in said one external database;

(c) creating an access procedure for processing said query in said one external database if it is determined that said functions referred to in said query are executable by access to said one external database and are specified by said user; and (d) creating an access procedure for processing for execution of some of the functions in said query which cannot be processed in said one external database in an internal database within said database management system if it is determined that said functions referred to in said query are not executable by access to said one external database.

3. The query method in the database management system according to claim 2, including the steps of:

if a query is confined to said one database and the user specifies that all functions in said query are processed in said one external database, creating an access procedure for processing said query in said one external database; and if the user specifies that functions in said query are not executed in said one external database, creating an access procedure for executing said functions in a database within said database management system having the function of accessing external databases.

4. The query method in the database management system according to claim 2, including the step of defining whether functions in a query can be executed in external databases, for each of types of database management systems managing external databases.

5. The query method in the database management system according to claim 2, wherein the step of the user defining whether functions in said query are executed in external databases includes the step of:

defining whether functions in a query can be executed in external databases, for each of types and versions of database management systems managing external databases.

6. A query execution program in a database management system having the function of accessing one or more external databases, the query execution program executing the procedures for:

obtaining specification about whether functions in a query sent from a user are executed in external databases;

(b) determining whether said functions referred to in said query are executable by access to one external database and are specified by said user to be executed in said one external database, (c) creating an access procedure for processing said query in said one external database if it is determined that said functions referred to in said query are executable by access to one external database and are specified by said user to be executed in said one external database, and (d) creating an access procedure for processing for execution of some of the functions in said query which cannot be processed in said one external database in an internal database within said database management system if it is determined that said functions referred to in said query are not executable by access to one external database.

7. The query execution program in the database management system according to claim 6, the query execution program executing the procedures for:

if a query is confined to said one database and the user specifies that all functions in said query are processed in said one external database, creating an access procedure for processing said query in said one external database; and if the user specifies that functions in said query are not executed in said one external database, creating an access procedure for executing said functions in a database within said database management system having the function of accessing external databases.

* * * * *